United States Patent
Ahn et al.

(10) Patent No.: US 12,327,373 B2
(45) Date of Patent: Jun. 10, 2025

(54) IMAGE PROCESSING APPARATUS AND OPERATION METHOD THEREOF

(71) Applicant: SAMSUNG ELECTRONICS CO., LTD., Suwon-si (KR)

(72) Inventors: Iljun Ahn, Suwon-si (KR); Soomin Kang, Suwon-si (KR); Hanul Shin, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 376 days.

(21) Appl. No.: 17/888,170

(22) Filed: Aug. 15, 2022

(65) Prior Publication Data
US 2023/0069072 A1    Mar. 2, 2023

Related U.S. Application Data

(63) Continuation of application No. PCT/KR2022/010787, filed on Jul. 22, 2022.

(30) Foreign Application Priority Data

Sep. 2, 2021  (KR) .................... 10-2021-0117194
Apr. 29, 2022  (KR) .................... 10-2022-0053808

(51) Int. Cl.
G06T 7/73    (2017.01)
G06V 10/44   (2022.01)

(52) U.S. Cl.
CPC ............... *G06T 7/73* (2017.01); *G06V 10/44* (2022.01); *G06T 2207/20081* (2013.01); *G06T 2207/20084* (2013.01)

(58) Field of Classification Search
CPC ............. G06T 7/73; G06T 2207/20081; G06T 2207/20084; G06T 5/60; G06T 5/70;
(Continued)

(56) References Cited

U.S. PATENT DOCUMENTS 10,949,952 B2    3/2021   Huang et al.
11,164,040 B2    11/2021  Park et al.
(Continued)

FOREIGN PATENT DOCUMENTS

CN    111680678 A    9/2020
CN    113011561 A    6/2021
(Continued)

OTHER PUBLICATIONS

International Search Report and Written Opinion dated Oct. 26, 2022, issued by the International Searching Authority in International Application No. PCT/KR2022/010787 (PCT/ISA/220, 210, 237).
(Continued)

*Primary Examiner* — Jianxun Yang
(74) *Attorney, Agent, or Firm* — Sughrue Mion, PLLC

(57) ABSTRACT

An image processing apparatus may include: a memory storing one or more instructions; and a processor configured to execute the one or more instructions stored in the memory, wherein the processor executes the one or more instructions to use one or more convolutional neural networks to: determine first parameters, based on position information of first pixels included in a first region of a first image and position information of samples of the first image; obtain sample values of the samples by applying the first parameters to pixel values of the first pixels; obtain feature information corresponding to the first region by performing a convolution operation between the sample values and a kernel of the one or more convolutional neural networks; and generate a second image, based on the feature information.

17 Claims, 12 Drawing Sheets

(58) Field of Classification Search
CPC ........ G06V 10/44; G06V 10/82; G06V 20/10; G06N 3/04; G06N 3/045; G06N 3/08
See application file for complete search history.

(56) References Cited

U.S. PATENT DOCUMENTS

| | | |
|---|---|---|
| 11,410,410 B2 | 8/2022 | Ha |
| 2017/0256030 A1* | 9/2017 | Kurita ..................... G06T 3/403 |
| 2019/0171930 A1 | 6/2019 | Lee et al. |
| 2021/0110254 A1 | 4/2021 | Hoang et al. |
| 2021/0201452 A1 | 7/2021 | Treibitz et al. |
| 2022/0067880 A1 | 3/2022 | Lim et al. |
| 2022/0254134 A1 | 8/2022 | Ren et al. |
| 2022/0270207 A1 | 8/2022 | Chen |

FOREIGN PATENT DOCUMENTS

| | | |
|---|---|---|
| KR | 10-2019-0066473 A | 6/2019 |
| KR | 10-2020-0071404 A | 6/2020 |
| KR | 10-2178932 B1 | 11/2020 |
| KR | 10-2021-0045264 A | 4/2021 |
| KR | 10-2021-0076687 A | 6/2021 |
| WO | 2019/109613 A1 | 6/2019 |
| WO | 2019/201141 A1 | 10/2019 |
| WO | 2021/128578 A1 | 7/2021 |

OTHER PUBLICATIONS

Extended European Search Report dated Oct. 18, 2024, issued by the European Patent Office in European Application No. 22864869.7.

"Bilinear interpolation", Wikipedia, 2021, pp. 1-5 (5 pages total).

* cited by examiner

IMAGE PROCESSING APPARATUS AND OPERATION METHOD THEREOF

CROSS-REFERENCE TO RELATED APPLICATIONS

This application claims priority from International Patent Application No. PCT/KR2022/010787, filed on Jul. 22, 2022, which claims priority to Korean Patent Application No. 10-2021-0117194 filed on Sep. 2, 2021, and Korean Patent Application No. 10-2022-0053808 filed on Apr. 29, 2022, in the Korean Intellectual Property Office, the disclosure of which are incorporated herein by reference in their entireties.

BACKGROUND

1. Field

Various embodiments of the disclosure relate to an image processing apparatus and operation method for processing an image by using a neural network.

2. Description of the Related Art

As data traffic increases exponentially with the development of computer technology, artificial intelligence has become an important trend that will drive future innovations. Because artificial intelligence is a method of imitating human thinking, it is widely applicable to various industries. Representative technologies of artificial intelligence include pattern recognition, machine learning, expert systems, neural networks, natural language processing, etc.

A neural network models the characteristics of human biological nerve cells by using mathematical expressions, and uses an algorithm that mimics the human ability to learn. Through this algorithm, a neural network is able to generate mapping data between input data and output data, and the ability to generate such mapping data may be called the learning capability of the neural network. Furthermore, neural networks have a generalization ability to generate, based on training results, correct output data with respect to input data that has not been used for training.

A convolutional neural network (CNN) performs a convolution operation by applying a kernel to each pixel in an input image. In general, because images have strong self-similarity, the closer the distance between a pixel to be processed (a center pixel) and its neighboring pixels, the higher the reliability of the neighboring pixels.

However, during a convolution operation of the related art, a distance between a center pixel and its neighboring pixels is not taken into account, and the same weight is applied to the neighboring pixels. Therefore, a problem occurs in that the reliability of the neighboring pixels according to their distance from the center pixel may not be reflected during the convolution operation.

SUMMARY

Various embodiments of the disclosure may provide an image processing apparatus and operation method for processing an image by using a convolutional neural network (CNN) that performs a convolution operation in which the reliability of neighboring pixels according to their distance from a center pixel is reflected.

According to an embodiment of the disclosure, an image processing apparatus includes: a memory storing one or more instructions; and a processor configured to execute the one or more instructions stored in the memory, wherein the processor executes the one or more instructions to use one or more convolutional neural networks to: determine first parameters, based on position information of first pixels included in a first region of a first image and position information of samples of the first image; obtain sample values of the samples by applying the first parameters to pixel values of the first pixels; obtain feature information corresponding to the first region by performing a convolution operation between the sample values and a kernel of the one or more convolutional neural networks; and generate a second image, based on the feature information.

The first pixels may include a center pixel located at a center of the first region and neighboring pixels, the samples may include the center pixel, and the neighboring pixels that may each be equidistant from the center pixel.

The number of the samples may be equal to the number of weights in the kernel.

The processor may be further configured to execute the one or more instructions to determine the first parameters, based on at least one of information about distances between the first pixels and the samples or information about areas of regions formed based on the first pixels and the samples.

The processor may be further configured to execute the one or more instructions to obtain a first sample value of a first sample by applying the first parameters to pixel values of second pixels located in a neighborhood of the first sample among the first pixels.

The processor may be further configured to execute the one or more instructions to determine the first parameters, based on distances between the second pixels and the first sample.

The processor may be further configured to execute the one or more instructions to determine the first parameters, based on information about areas of regions formed by the second pixels and the first sample.

A sum of the first parameters applied to the second pixels may be 1.

According to another embodiment of the disclosure, an image processing apparatus includes: a memory storing one or more instructions; and a processor configured to execute the one or more instructions stored in the memory, wherein the processor executes the one or more instructions to use one or more convolutional neural networks to: determine first parameters, based on position information of first pixels included in a first region of a first image and position information of samples; obtain adjusted weights by applying the first parameters to weights in a kernel of the one or more convolutional neural networks; obtain feature information corresponding to the first region by performing a convolution operation between pixel values of the first pixels and the adjusted weights; and generate a second image, based on the feature information.

The first pixels may include a center pixel located at a center of the first region and neighboring pixels of the center pixel, the samples may include the center pixel, and the neighboring pixels that may each be equidistant from the center pixel.

The processor may be further configured to execute the one or more instructions to determine the first parameters, based on at least one of information about distances between the first pixels and the samples or information about areas of regions formed based on the first pixels and the samples.

The processor may be further configured to execute the one or more instructions to determine the first parameters, based on the weights in the kernel.

According to another embodiment of the disclosure, an operation method of an image processing apparatus for processing an image by using one or more convolutional neural networks includes: determining first parameters, based on position information of first pixels included in a first region of a first image and position information of samples of the first image; obtaining sample values of the samples by applying the first parameters to pixel values of the first pixels; obtaining feature information corresponding to the first region by performing a convolution operation between the sample values and a kernel of the one or more convolutional neural networks; and generating a second image, based on the feature information.

According to another embodiment of the disclosure, an operation method of an image processing apparatus for processing an image by using one or more convolutional neural networks includes: determining first parameters, based on position information of first pixels included in a first region of a first image and position information of samples of the first image; obtaining adjusted weights by applying the first parameters to weights in a kernel of the one or more convolutional neural networks; obtaining feature information corresponding to the first region by performing a convolution operation between pixel values of the first pixels and the adjusted weights; and generating a second image, based on the feature information.

According to another embodiment of the disclosure, there is provided on or more non-transitory computer-readable recording media having stored thereon a program that is executable by a computer to perform the operation method of the image processing apparatus for processing the image by using the one or more convolutional neural networks.

According to another embodiment of the disclosure, an electronic device may include: at least one memory storing one or more instructions; and at least one processor configured to execute the one or more instructions to: input a first image into a convolutional neural network including at least one kernel; compute parameters, which are to be applied to weights of the at least one kernel, based on relations between positions of a set of pre-set pixels and positions of sample pixels of the first image; adjust the weights of the at least one kernel by applying the computed parameters to the weights; and output a second image from the convolutional neural network by performing a convolution operation on the first image via the at least one kernel having the adjusted weights, wherein the second image has a higher resolution than the first image.

An image processing apparatus according to an embodiment of the disclosure may provide improved image processing performance by performing a convolution operation in which the reliability of neighboring pixels according to their distance from a center pixel is reflected.

An image processed through a convolutional neural network (CNN) according to an embodiment of the disclosure may have a higher quality than that of an image processed through an existing CNN.

BRIEF DESCRIPTION OF DRAWINGS

The above and/or other aspects will be more apparent by describing certain example embodiments, with reference to the accompanying drawings, in which.

DETAILED DESCRIPTION

Figure 1:
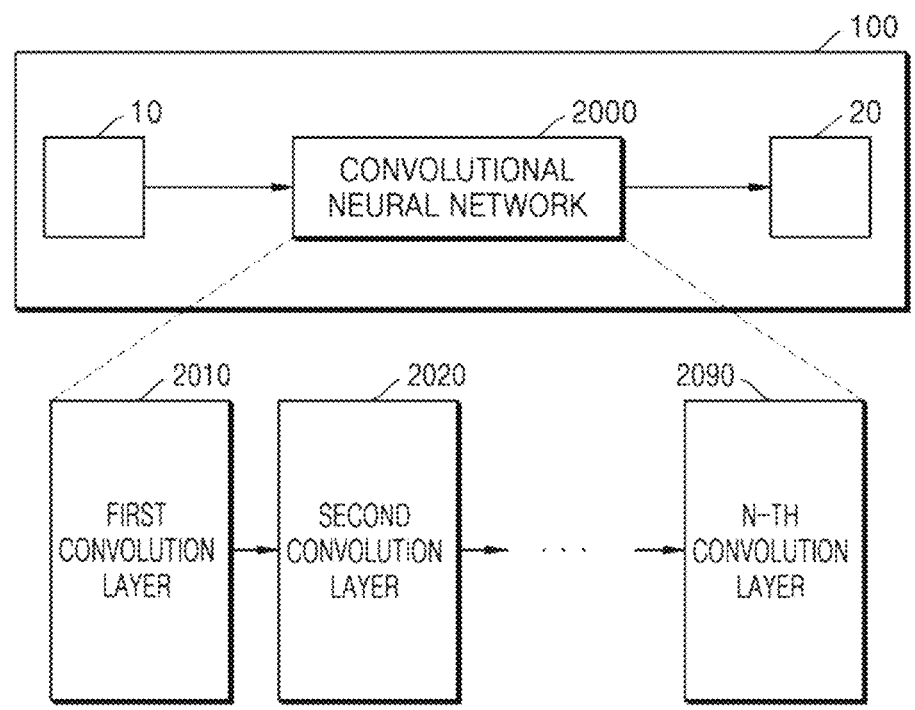
FIG. 1 is a diagram illustrating an operation of an image processing apparatus processing an image using a convolutional neural network (CNN), according to an embodiment of the disclosure.

Throughout the disclosure, the expression "at least one of a, b or c" indicates only a, only b, only c, both a and b, both a and c, both b and c, all of a, b, and c, or variations thereof.

While such terms as "first," "second," etc., may be used to describe various elements, such elements must not be limited to the above terms. The above terms may be used only to distinguish one element from another.

Terms used in the present specification will now be briefly described and then the disclosure will be described in detail.

As the terms used herein, general terms that are currently widely used are selected by taking functions according to the disclosure into account, but the terms may have different meanings according to the intention of one of ordinary skill in the art, precedent cases, or advent of new technologies. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Throughout the specification, when a part "includes" or "comprises" an element, unless there is a particular description contrary thereto, it is understood that the part may further include other elements, not excluding the other elements. In addition, terms such as "portion", "module", etc., described in the specification refer to a unit for processing at least one function or operation and may be embodied as hardware or software, or a combination of hardware and software.

Embodiments of the disclosure will now be described more fully hereinafter with reference to the accompanying drawings so that they may be easily implemented by one of ordinary skill in the art. However, embodiments of the disclosure may have different forms and should not be construed as being limited to the embodiments set forth herein. In addition, parts not related to descriptions of the disclosure are omitted to clearly explain embodiments of the disclosure in the drawings, and like reference numerals denote like elements throughout.

FIG. 1 is a diagram illustrating an operation of an image processing apparatus processing an image using a convolutional neural network (CNN), according to an embodiment of the disclosure.

Referring to FIG. 1, a CNN 2000 according to an embodiment of the disclosure may receive a first image 10 as input and process the first image 10 to output a second image 20. In this case, the first image 10 may be an image including noise or artifacts, and may be a low-resolution image or a low-quality image, compared to the second image 20. An image processing apparatus 100 may generate the second image 20 by performing denoising on the first image 10 to remove noise using the CNN 2000 while maintaining fine edges and textures of the first image 10. The second image 20 may have a higher resolution and a higher quality than the first image 10. However, embodiments of the disclosure are not limited thereto.

The CNN 2000 according to an embodiment of the disclosure may include one or more convolutional layers 2010, 2020, . . . , and 2090. Each of the convolutional layers 2010, 2020, . . . , and 2090 may perform a convolution operation between an image (or feature information) input to a corresponding convolutional layer and a kernel.

Figure 2:
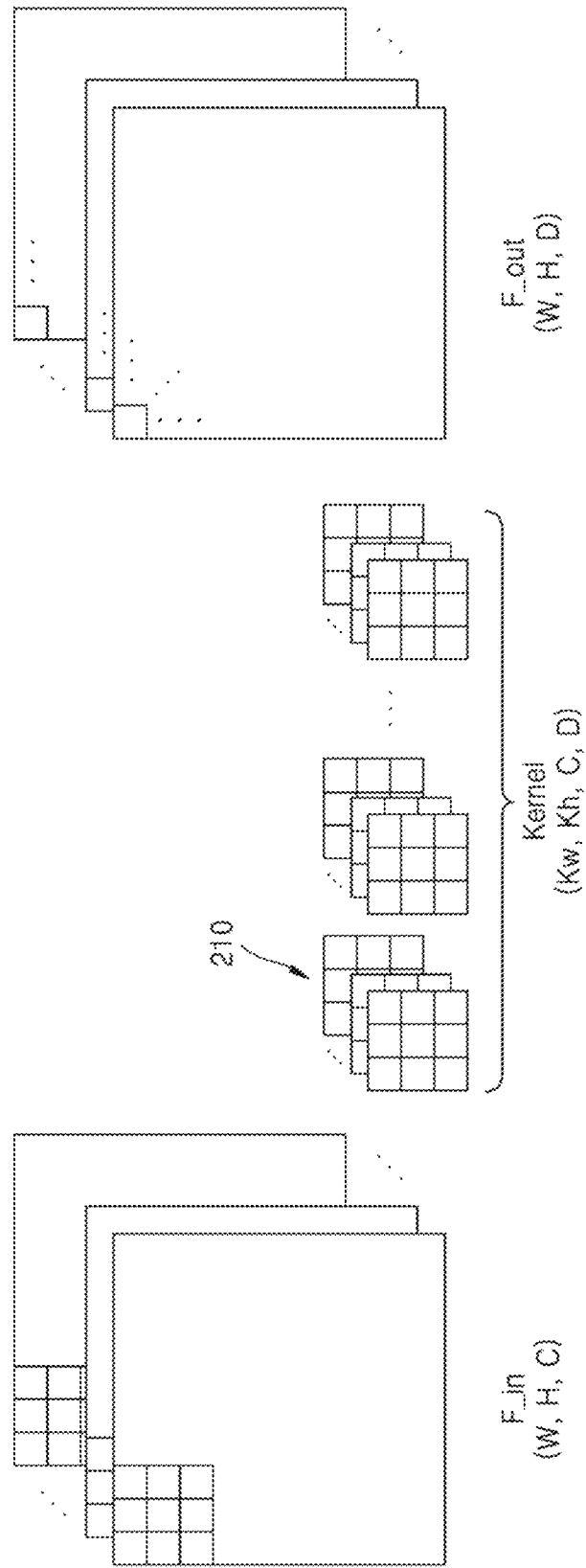
FIGS. 2 and 3 are diagrams for describing a convolution operation performed by a convolutional layer in the related art.
Figure 3:
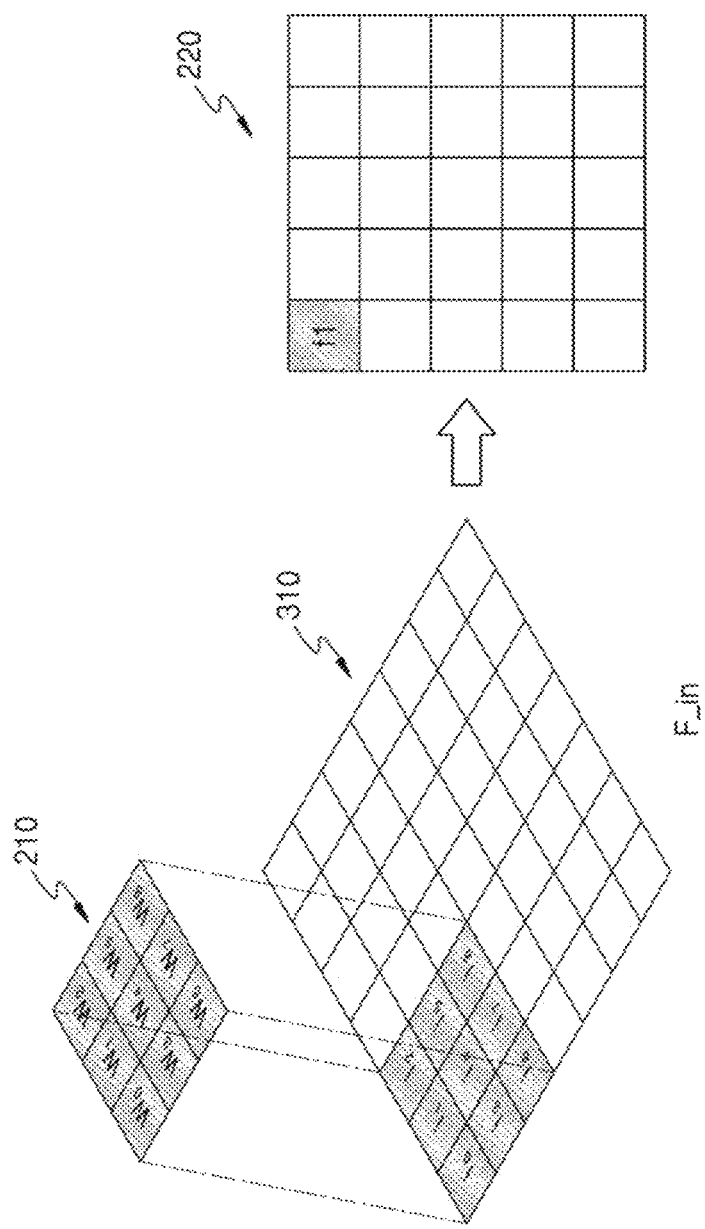

FIGS. 2 and 3 are diagrams for describing convolution operations performed by a convolutional layer in the related art.

FIG. 2 illustrates an input image (or an input feature map) F_in input to a convolutional layer, a kernel included in the convolutional layer, and an output image (or an output feature map) F_out output from the convolutional layer.

Referring to FIG. 2, a size of the input image F_in input to the convolutional layer may be W×H, and the number of channels in the input image F_in may be C. Also, the convolutional layer may include a kernel, and the kernel may include D sub-kernels. In addition, each sub-kernel may have a size of Kw×Kh×C. The number of channels (C) in each sub-kernel may be equal to the number of channels (C) in the input image F_in. The convolutional layer may generate the output image F_out by performing a convolution operation between the input image F_in and the kernel. In particular, a size of the output image F_out may be W×H, and the number of channels in the output image F_out may be determined by the number D of sub-kernels in the kernel. For example, a first channel image of the output image F_out may be generated by performing a convolution operation between the input image F_in and a first sub-kernel, and a second channel image of the output image F_out may be generated by performing a convolution operation between the input image F_in and a second sub-kernel. Also, a D-th channel image of the output image F_out may be generated by performing a convolution operation between the input image F_in and a D-th sub-kernel.

FIG. 3 is a reference diagram for explaining a process of generating a first channel image 220 of an output image F_out via a convolution operation between an input image F_in and a first sub-kernel 210 included in a kernel, according to an embodiment of the disclosure.

In FIG. 3, for convenience of description, it is assumed that the input image F_in has a size of 7×7 and the number of channels C is 1. It is also assumed that each sub-kernel included in the kernel applied to the input image F_in has a size of 3×3 and the number of channels C is 1.

FIG. 3 illustrates a process of extracting features of the input image F_in by applying the first sub-kernel 210 from a top left corner of the input image F_in to a bottom right corner thereof. In this case, the first sub-kernel 210 has a size of 3×3, and the number of channels is 1. For example, a convolution operation may be performed by applying the first sub-kernel 210 to pixels included in a top left 3×3 region of the input image F_in.

In other words, a single pixel value f1 mapped to the top left 3×3 region 310 may be computed by multiplying pixel values of pixels $i_0$, $i_1$, $i_2$, $i_3$, $i_4$, $i_5$, $i_6$, $i_7$, and $i_8$ in the top left 3×3 region 310 element-wise by weights $w_0$, $w_1$, $w_2$, $w_3$, $w_4$, $w_5$, $w_6$, $w_7$, and $w_8$ in the first sub-kernel 210 and summing these products together.

In this case, the pixel value f1 may be expressed by Equation 1 below.

$$f1 = w_0 i_0 + w_1 i_1 + w_2 i_2 + w_3 i_3 + w_4 i_4 + w_5 i_5 + w_6 i_6 + w_7 i_7 + w_8 i_8 \quad \text{[Equation 1]}$$

In the same manner, as the first sub-kernel 210 slides across the input image F_in from left to right and from top to bottom one pixel at a time, parameter values included in the first sub-kernel 210 are multiplied by corresponding pixel values in the input image F_in and then summed together to generate pixel values included in the first channel image 220 of the output image F_out. In this case, although data to be subjected to the convolution operation may be sampled while moving the first sub-kernel 210 one pixel at a time, the data may be sampled while moving it two or more pixels at a time. A distance between pixels sampled in a sampling process is referred to as a stride, and a size of the output image F_out may be determined according to a size of the stride. Furthermore, as shown in FIG. 2, padding may be performed to make the size of the output image F_out equal to that of the input image F_in. The padding refers to increasing the size of the input image F_in by assigning a specific value (e.g., '0') to edges of the input image F_in in order to prevent reduction in the size of the output image F_out. When a convolution operation is performed after padding, the size of the output image F_out may be kept the same as the size of the input image F_in. However, embodiments of the disclosure are not limited thereto.

Moreover, although FIG. 3 illustrates only the result of the convolution operation with the first sub-kernel 210 (the first channel image 220 of the output image F_out), when convolution operations are performed using D sub-kernels, the output image F_out including D channel images may be output. In other words, the number of channels in the output image F_out may be determined according to the number of sub-kernels included in the kernel.

Figure 4:
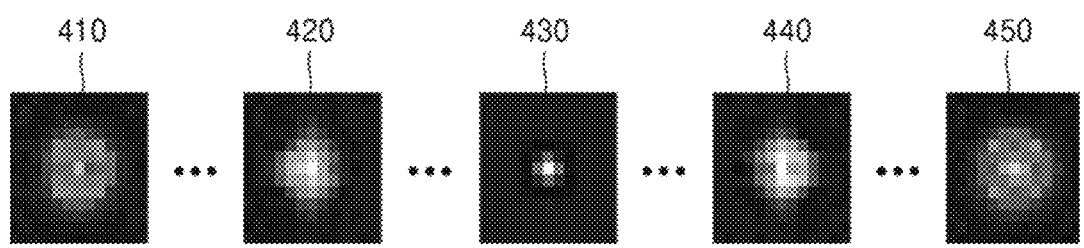
FIG. 4 illustrates kernels included in a CNN for removing noise from an image.

FIG. 4 illustrates kernels included in a CNN for removing noise from an image.

Referring to FIG. 4, the CNN for removing noise from an image may include first through fifth kernels 410, 420, 430, 440, and 450. Each of the first through fifth kernels 410, 420, 430, 440, and 450 may include weights determined and updated through training of the CNN. When weights included in each of the first through fifth kernels 410, 420, 430, 440, and 450 are displayed in a color (e.g., in grayscale), a circular or elliptical shape appears in each of the first through fifth kernels 410, 420, 430, 440, and 450. Because images have a strong self-similarity, a pixel closer to a pixel to be processed (a center pixel) has a higher reliability, and accordingly, a weight increases as it is closer to a center of a kernel. Also, weights located at the same distance from the center of the kernel have similar values.

However, a convolution operation of the related art has a problem in that reliability according to a distance between a central pixel and its neighboring pixels is not reflected. For example, referring to FIG. 3, a convolution is performed for a center pixel $i_4$ by applying, to neighboring pixels $i_0$, $i_1$, $i_2$, $i_3$, $i_5$, $i_6$, $i_7$, and $i_8$, the weights $w_0$, $w_1$, $w_2$, $w_3$, $w_5$, $w_6$, $w_7$, and $w_8$ corresponding thereto. However, first neighboring pixels $i_1$, $i_2$, $i_6$, and $i_8$ among the neighboring pixels $i_0$, $i_1$, $i_2$, $i_3$, $i_5$, $i_6$, $i_7$, and $i_8$ have a higher reliability because they are closer to the center pixel $i_4$ than the second neighboring pixels $i_0$, $i_2$, $i_6$, and $i_8$, whereas the second neighboring pixels $i_0$, $i_2$, $i_6$, and $i_8$ have a lower reliability because they are farther from the center pixel $i_4$ than the first neighboring pixels $i_1$, $i_3$, $i_5$, and $i_7$.

Therefore, to improve the performance of a CNN for image processing, a convolution operation needs to be performed by reflecting such reliability.

Referring back to FIG. 1, the CNN 2000 according to an embodiment of the disclosure may perform a convolution operation in which the reliability of neighboring pixels according to a distance from a central pixel is reflected. Image processing performed by each of the convolutional layers in the CNN 2000 according to an embodiment of the disclosure will be described in detail below with reference to the drawings.

Figure 5:
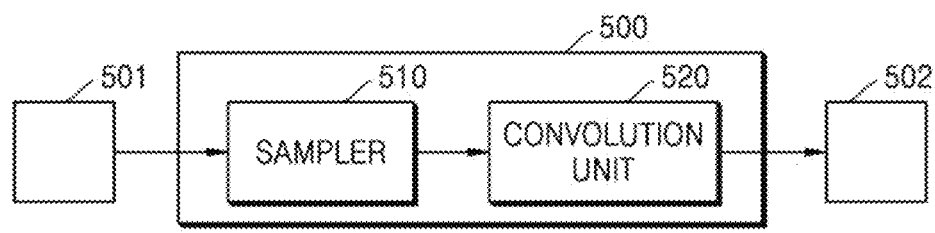
FIG. 5 illustrates a configuration of one convolutional layer according to an embodiment of the disclosure.

FIG. 5 illustrates a configuration of one convolutional layer according to an embodiment of the disclosure.

Referring to FIG. 5, a convolutional layer 500 according to an embodiment of the disclosure may include a sampler 510 and a convolution unit 520. The convolutional layer 500 may be any one of the first through N-th convolutional layers 2010, 2020, . . . , and 2090 of FIG. 1. For example, each of the first through N-th convolutional layers 2010, 2020, . . . , and 2090 may include a sampler 510 and a convolution unit 520. According to an embodiment of the disclosure, the convolutional layer 500 may include a structure for receiving first feature information 501 (or an input image) and outputting second feature information 502 (or an output image), and the first feature information 501 may have the same size as the second feature information 502 but is not limited thereto.

Hereinafter, operations performed in the convolutional layer 500 will be described in detail with reference to FIG. 6.

Figure 6:
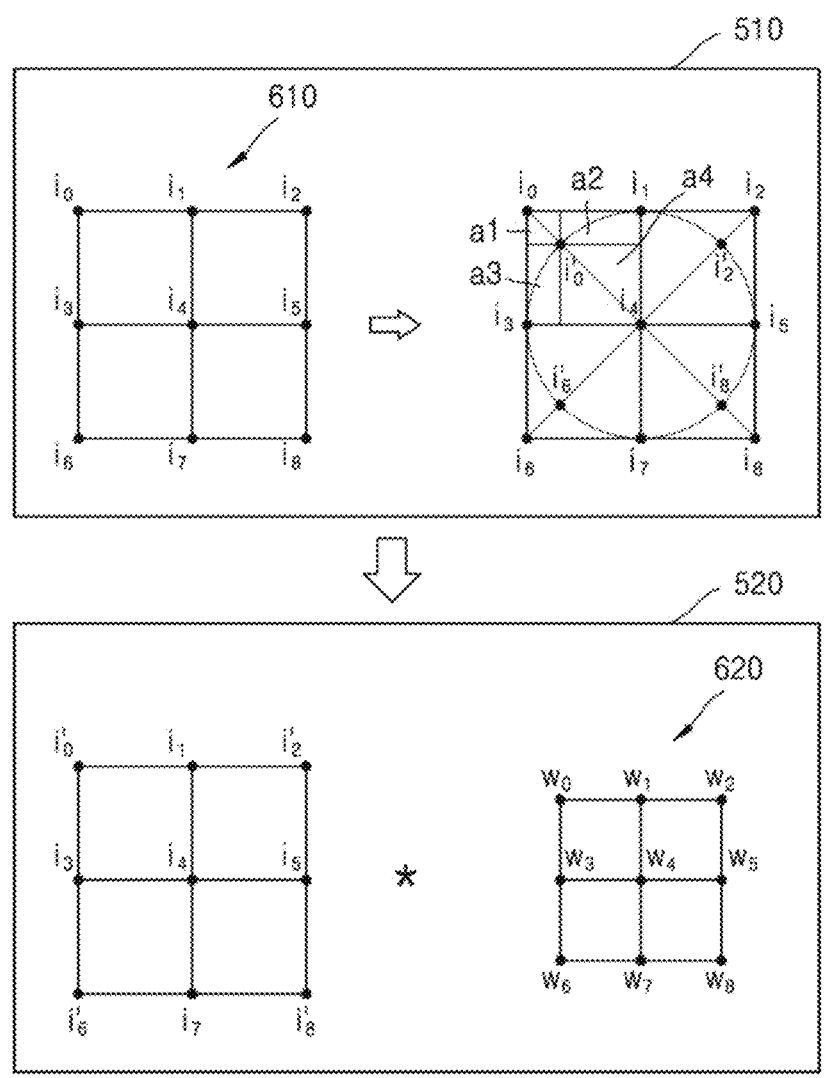
FIG. 6 is a reference diagram for describing operations of a sampler and a convolution unit, according to an embodiment of the disclosure.

FIG. 6 is a reference diagram for describing operations of the sampler and the convolution unit according to an embodiment of the disclosure.

According to an embodiment of the disclosure, the sampler 510 may obtain a plurality of samples by sampling a center pixel $i_4$ located at a center among pixels, i.e., first through ninth pixels $i_0$, $i_1$, $i_2$, $i_3$, $i_4$, $i_5$, $i_6$, $i_7$, and $i_8$, in a region 610 (hereinafter referred to as a first region 610) to be subjected to a convolution operation, from among pixels included in the first feature information 501 input to the convolutional layer 500 and sampling points that are equidistant from the center pixel $i_4$. For example, the sampler 510 may sample points located at 45-degree intervals from among points included in a circumference of a circle having the center pixel $i_4$ as its center and a distance between the center pixel $i_4$ and the second pixel $i_1$ as its radius. As shown in FIG. 6, the second pixel $i_1$, the fourth pixel $i_5$, the sixth pixel $i_5$, and the eighth pixel $i_7$ may be sampled, and points that make an angle of 45 degrees with the second pixel $i_1$, the fourth pixel $i_3$, the sixth pixel $i_5$, and the eighth pixel $i_7$ may be sampled. Accordingly, first through ninth samples $i'_0$, $i_1$, $i'_2$, $i_3$, $i_4$, $i_5$, $i'_6$, $i_7$, and $i'_8$ may be determined, so that the samples $i'_0$, $i_1$, $i'_2$, $i_3$, $i_5$, $i'_6$, $i_7$, and $i'_8$ are selected from the circumference of a circle having the center pixel 14 at the center, in a manner in which the distances between two adjacent samples (e.g., an arc between samples $i'_0$ and $i_1$, an arc between samples $i_1$ and $i'_2$, and an arc between samples $i'_2$ and $i_3$, and the like) along the circumference of the circle are equal to each other.

However, a method of determining positions of samples is not limited to the above-described method, and the positions of the samples may be determined using other various methods.

Furthermore, the sampler 510 may obtain sample values of determined samples based on pixel values of the first through ninth pixels $i_0$, $i_1$, $i_2$, $i_3$, $i_4$, $i_5$, $i_6$, $i_7$, and is included in the first region 610. For example, the sampler 510 may obtain sample values of samples by applying parameter information to the pixel values of the first through ninth pixels $i_0$, $i_1$, $i_2$, $i_3$, $i_4$, $i_5$, $i_6$, $i_7$, and $i_8$ included in the first region 610. In this case, the sampler 510 may determine parameter information (first parameter information) based on position information of the first through ninth pixels $i_0$, $i_1$, $i_2$, $i_3$, $i_4$, $i_5$, $i_6$, $i_7$, and $i_8$ included in the first region 610 and position information of the determined first through ninth samples $i'_0$, $i_1$, $i'_2$, $i_3$, $i_4$, $i_5$, $i'_6$, $i_7$, and $i'_8$.

In detail, the sampler 510 may obtain a sample value of the first sample $i'_0$ based on pixel values of the first, second, fourth, and fifth pixels $i_0$, $i_1$, $i_3$, and $i_4$ in a neighborhood of the first sample $i'_0$. In particular, first parameters applied to the pixel values of the first, second, fourth, and fifth pixels $i_0$, $i_1$, $i_3$, and $i_4$ may be determined based on a relationship between a position of the first sample $i'_0$ and a position of each of the first, second, fourth, and fifth pixels $i_0$, $i_1$, $i_3$, and $i_4$ in the neighborhood of the first sample $i'_0$.

The sampler 510 may determine the first parameters based on information about a distance between the first sample $i'_0$ and each of the first, second, fourth, and fifth pixels $i_0$, $i_1$, $i_3$, and $i_4$ that are the neighboring pixels, information about areas formed based on the first sample $i'_0$ and the first, second, fourth, and fifth pixels $i_0$, $i_1$, $i_3$, and $i_4$ that are the neighboring pixels, etc.

For example, as shown in FIG. 6, the sampler 510 may determine the first parameters based on an area of a first rectangle a1 having a line between the first sample $i'_0$ and the first pixel $i_0$ as a diagonal, an area of a second rectangle a2 having a line between the first sample $i'_0$ and the second pixel $i_1$ as a diagonal, an area of a third rectangle a3 having a line between the first sample $i'_0$ and the fourth pixel $i_3$ as a diagonal, and an area of a fourth rectangle a4 having a line between the first sample $i'_0$ and the fifth pixel $i_4$.

For example, the area of the first rectangle a1, the area of the second rectangle a2, the area of the third rectangle a3, and the fourth rectangle a4 when the sum of the areas of the first through fourth rectangles a1 through a4 is assumed to be 1 may be determined as the first parameters, and the area of the second rectangle a2 may be equal to the area of the third rectangle a3. In this case, the area ($a_0$ in Equation 2 below) of the first rectangle a1 may be 0.08578, the areas ($a_1$ in Equation 2 below) of the second and third rectangles a2 and a3 may be 0.20711, and the area (a2 in Equation 2 below) of the fourth rectangle a4 may be 0.5.

The sampler 510 may obtain a sample value of the first sample $i'_0$ by applying the first parameters to the pixels $i_0$, $i_1$, $i_3$, and $i_4$ in the neighborhood of the first sample $i'_0$, and the sample value of the first sample $i'_0$ may be expressed by the following Equation 2.

$$i'_0 = a_0 i_0 + a_1 i_1 + a_1 i_2 + a_2 i_6 \qquad \text{[Equation 2]}$$

The sampler 510 may also obtain sample values of the third, seventh, and ninth samples $i'_2$, $i'_6$, and $i'_8$ by using the same method as the method of obtaining the sample value of the first sample $i'_0$, and the sample values of the third, seventh, and ninth samples $i'_2$, $i'_6$, and $i'_8$ may be respectively expressed by Equations 3 through 5 below.

$$i'_2 = a_0 i_2 + a_1 i_1 + a_1 i_8 + a_2 i_6 \quad \text{[Equation 3]}$$

$$i'_6 = a_0 i_6 + a_1 i_3 + a_1 i_7 + a_2 i_6 \quad \text{[Equation 4]}$$

$$i'_8 = a_0 i_8 + a_1 i_5 + a_1 i_7 + a_2 i_4 \quad \text{[Equation 5]}$$

Furthermore, a sample value of the second sample $i_1$ is equal to the pixel value of the second pixel $i_1$, a sample value of the fourth sample $i_3$ is equal to the pixel value of the fourth pixel $i_3$, a sample value of the fifth sample $i_4$ is equal to the pixel value of the fifth pixel $i_4$, a sample value of the sixth sample $i_5$ is equal to the pixel value of the sixth pixel $i_5$, and a sample value of the eighth sample $i_7$ is equal to the pixel value of the eighth pixel $i_7$.

The convolution unit 520 may obtain a feature value f1 corresponding to the first region 610 by performing a convolution operation between the sample values of the first through ninth samples $i'_0$, $i_1$, $i'_2$, $i_3$, $i_4$, $i_5$, $i'_6$, $i_7$, and $i'_8$ obtained by the sampler 510 and a kernel 620. For example, the feature value f1 may be obtained by respectively multiplying the sample values of the first through ninth samples $i'_0$, $i_1$, $i'_2$, $i_3$, $i_4$, $i_5$, $i'_6$, $i_7$, and $i'_8$ by first through ninth weights $w_0$, $w_1$, $w_2$, $w_3$, $w_4$, $w_5$, $w_6$, $w_7$, and $w_8$ in the kernel 620 and summing these products together, and the feature value f1 may be expressed by the following Equation 6.

$$f1 = \quad \text{[Equation 6]}$$
$$w_0 i'_0 + w_1 i_1 + w_2 i'_2 + w_3 i_3 + w_4 i_4 + w_5 i_5 + w_6 i'_6 + w_7 i_7 + w_8 i'_8 =$$
$$w_0(\alpha_0 i_0 + \alpha_1 i_1 + \alpha_1 i_3 + \alpha_2 i_4) + w_1 i_1 +$$
$$w_2(\alpha_0 i_2 + \alpha_1 i_1 + \alpha_1 i_5 + \alpha_2 i_4) + w_3 i_3 +$$
$$w_4 i_4 + w_5 i_5 + w_6(\alpha_0 i_6 + \alpha_1 i_3 + \alpha_1 i_7 + \alpha_2 i_4) +$$
$$w_7 i_7 + w_8(\alpha_0 i_8 + \alpha_1 i_5 + \alpha_1 i_7 + \alpha_2 i_4)$$

Figure 7:
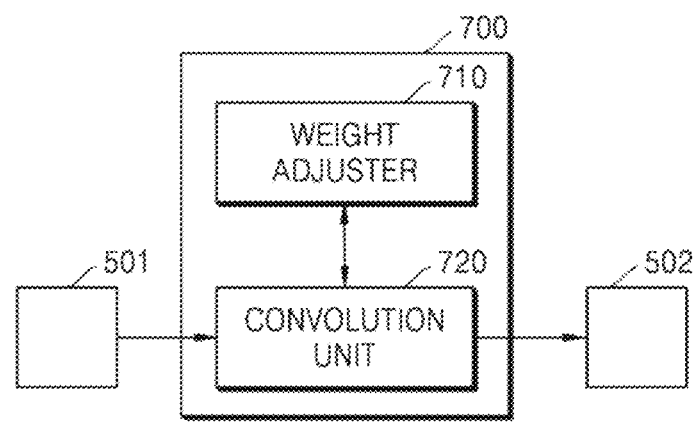
FIG. 7 is a diagram illustrating a configuration of one convolutional layer according to an embodiment of the disclosure.

FIG. 7 illustrates a configuration of one convolutional layer according to another embodiment of the disclosure.

Referring to FIG. 7, a convolutional layer 700 according to another embodiment of the disclosure may include a weight adjuster 710 and a convolution unit 720. The convolutional layer 700 may be any one of the first through N-th convolutional layers 2010, 2020, . . . , and 2090 of FIG. 1. For example, each of the first through N-th convolutional layers 2010, 2020, . . . , and 2090 may include the weight adjuster 710 and the convolution unit 720. In another example, one (or more than one) weight adjuster 710 may adjust weights of the first through N-th convolutional layers 2010, 2020, . . . , and 2090. The convolution unit 720 may contain a set of filters (or kernels), weights, and parameters of which are to be learned by the weight adjuster 710 throughout training. The weight adjuster 710 may compute a loss between an output image or second feature information 502, and a labeled image or labeled feature information, and may back-propagate the loss to the convolution unit 720 to adjust parameters and/or weights of the convolution unit to minimize the loss. According to an embodiment of the disclosure, the convolutional layer 700 may include a structure for receiving first feature information 501 (or an input image) and outputting second feature information 502 (or an output image), and the first feature information 501 may have the same size as the second feature information 502 but is not limited thereto. In one or more embodiments of the disclosure, the "convolution unit" 720 may be referred to as a convolutional layer, and the weight adjuster 710 may be implemented as being placed outside the convolutional layer.

Moreover, in the convolutional layer 500 of FIG. 5, a convolution is performed with a kernel after applying parameter information (first parameter information) to pixel values included in a region to be subjected to the convolution. In this case, because parameter information (first parameter information) needs to be applied to input pixel values each time a convolution is performed, the amount of calculation increases. On the other hand, in the convolutional layer 700 of FIG. 7, weights in a kernel may be changed by applying parameter information (second parameter information) to the weights. The changed weights may be equally applied to a convolution, and this eliminates the need to apply parameter information (first parameter information) each time the convolution is performed. Therefore, the efficiency of calculation may be improved.

Hereinafter, operations performed in the convolutional layer 700 will be described in detail with reference to FIG. 8.

Figure 8:
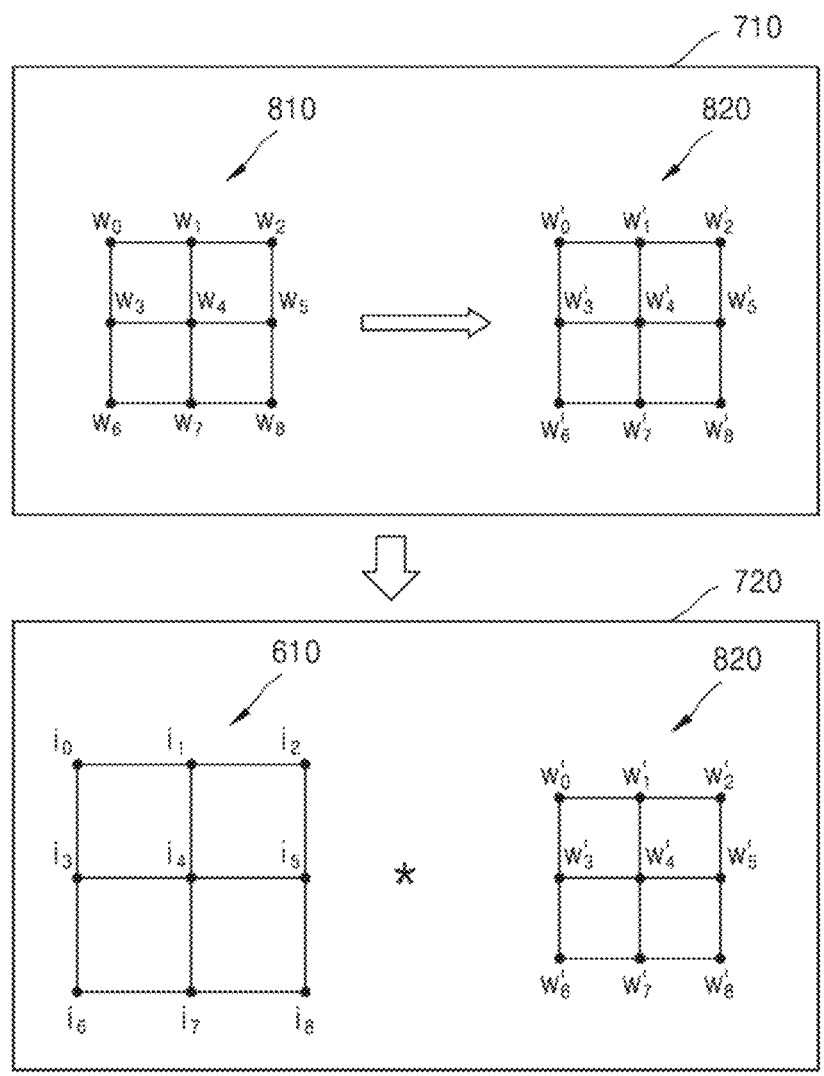
FIG. 8 is a reference diagram for describing operations of a weight adjuster and a convolution unit, according to an embodiment of the disclosure.

FIG. 8 is a reference diagram for describing operations of the weight adjuster 710 and the convolution unit 720 according to an embodiment of the disclosure.

According to an embodiment of the disclosure, the weight adjuster 710 may adjust weights $w_0$, $w_1$, $w_2$, $w_3$, $w_4$, $w_5$, $w_6$, $w_7$, and $w_8$ included in a kernel 810 by applying parameter information (second parameter information) thereto.

For example, the weight adjuster 710 may determine parameter information (first parameter information) based on position information of pixels in a region to be subjected to a convolution operation from among pixels included in the first feature information 501 input to the convolutional layer 700 and position information of samples. In this case, because a method of determining the positions of the samples is substantially the same as the method illustrated in and described with reference to FIG. 6, a detailed description thereof will be omitted here. For example, as shown in FIG. 6, first through ninth samples $i'_0$, $i_1$, $i'_2$, $i_3$, $i_4$, $i_5$, $i'_6$, $i_7$, and $i'_8$ may be determined.

The weight adjuster 710 may determine parameter information (first parameter information) based on position information of first through ninth pixels $i_0$, $i_1$, $i_2$, $i_3$, $i_4$, $i_5$, $i_6$, $i_7$, and $i_8$ included in a first region 610 and position information of the determined first through ninth samples $i'_0$, $i_1$, $i'_2$, $i_3$, $i_4$, $i_5$, $i'_6$, $i_7$, and $i'_8$.

In detail, when Equation 6 above is rearranged into an equation in terms of the first through ninth pixels $i_0$, $i_1$, $i_2$, $i_3$, $i_4$, $i_5$, $i_6$, $i_7$, and $i_8$ included in the first region 610, the feature value f1 may be expressed by the following Equation 7.

$$f1 = \quad \text{[Equation 7]}$$
$$w'_0 i_0 + w'_1 i_1 + w'_2 i_2 + w'_3 i_3 + w'_4 i_4 + w'_5 i_5 + w'_6 i_6 + w'_7 i_7 + w'_8 i_8 =$$
$$(\alpha_0 w_0) i_0 + (\alpha_1 (w_0 + w_2) + w_1) i_1 + (\alpha_0 w_2) i_2 +$$
$$(\alpha_1 (w_0 + w_6) + w_3) i_3 + (\alpha_2 w_0 + \alpha_2 w_2 + \alpha_2 w_6 + \alpha_2 w_8) i_4 +$$
$$(\alpha_1 (w_2 + w_8) + w_5) i_5 + \alpha_0 w_6 i_6 + (\alpha_1 (w_6 + w_8) + w_7) i_7 + \alpha_0 w_8 i_8$$

Accordingly, adjusted weights $w'_0$, $w'_1$, $w'_2$, $w'_3$, $w'_4$, $w'_5$, $w'_6$, $w'_7$, and $w'_8$ may be respectively expressed by Equations 8 through 16 below.

$$w'_0 = a_0 w_0 \quad \text{[Equation 8]}$$

$$w'_1 = a_1(w_0 + w_2) + w_1 \quad \text{[Equation 9]}$$

$$w_2' = a_0 w_2 \quad \text{[Equation 10]}$$

$$w_3' = a_1(w_0 + w_6) + w_3 \quad \text{[Equation 11]}$$

$$w_4' = a_2 w_0 + a_2 w_2 + a_2 w_6 + a_2 w_8 \quad \text{[Equation 12]}$$

$$w_5' = a_1(w_2 + w_8) + w_5 \quad \text{[Equation 13]}$$

$$w_6' = a_0 w_6 \quad \text{[Equation 14]}$$

$$w_7' = a_1(w_5 + w_8) + w_7 \quad \text{[Equation 15]}$$

$$w_8' = a_0 w_8 \quad \text{[Equation 16]}$$

The weight adjuster 710 may obtain the adjusted weights $w'_0$, $w'_1$, $w'_2$, $w'_3$, $w'_4$, $w'_5$, $w'_6$, $w'_7$, and $w'_8$ (820) by respectively applying parameter information (the second parameter information) obtained in Equations 8 through 16 to the weights $w_0$, $w_1$, $w_2$, $w_3$, $w_4$, $w_5$, $w_6$, $w_7$, and $w_8$ in the first kernel 810.

The convolution unit 720 may obtain a feature value f1 corresponding to the first region 610 by performing a convolution operation between the adjusted weights $w'_0$, $w'_1$, $w'_2$, $w'_3$, $w'_4$, $w'_5$, $w'_6$, $w'_7$, and $w'_8$ (820) obtained by the weight adjuster 710 and the first through ninth pixels $i_0$, $i_1$, $i_2$, $i_3$, $i_4$, $i_5$, $i_6$, $i_7$, and $i_8$ in the first region 610.

Figure 9:
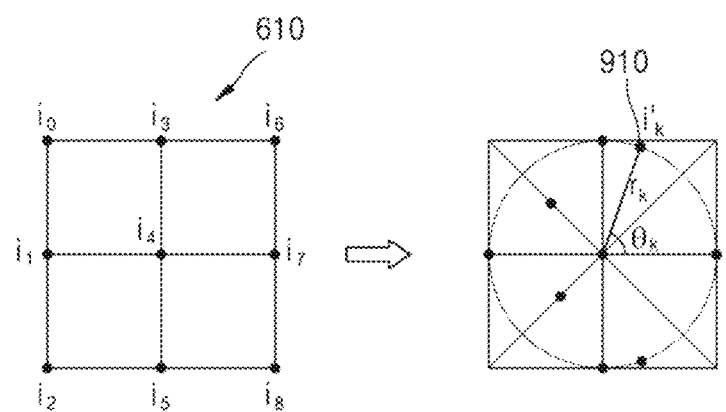
FIG. 9 is a diagram illustrating positions of samples obtained by performing sampling in a first region, according to an embodiment of the disclosure.

FIG. 9 is a diagram illustrating positions of samples obtained by performing sampling in a first region, according to an embodiment of the disclosure.

Referring to FIG. 9, according to an embodiment of the disclosure, the sampler 510 may obtain a plurality of samples by sampling points at various positions in a first region 610. Although it has been shown and described with reference to FIG. 9 that a plurality of samples are located at the same distance from a center pixel and are equidistant from one another, embodiments of the disclosure are not limited thereto.

The sampler 510 may determine positions of the samples in various ways according to characteristics of a first image. For example, the sampler 510 may extract edge information of the first image and determine positions of samples based on the extracted edge information. Alternatively, the sampler 510 may extract texture information of the first image and determine positions of samples based on the extracted texture information. Furthermore, when the first image includes a plurality of channel images, the sampler 510 may determine the positions of samples differently in each of the channel images.

Accordingly, the position of each sample may be represented by information about a distance from a center pixel and information about an angle formed with respect to a reference line. For example, a first sample $i'_k$ 910 may be represented by distance information $r_k$ for the first sample $i'_k$ and angle information $O_k$ for the first sample $i'_k$. According to a position of each of the samples, parameter information (first parameter information) applied to pixel values of pixels in the neighborhood of each sample may be determined, so as to obtain a sample value. After the parameter information is determined, the sampler 510 may obtain a sample value of each of the samples by applying the parameter information to pixels in the neighborhood of each of the samples.

The convolution unit 520 may obtain a feature value f1 corresponding to the first region 610 by performing a convolution operation between sample values of the samples and a kernel.

Moreover, as described above, according to another embodiment of the disclosure, the weight adjuster 710 may determine second parameter information for adjusting weights included in the kernel based on the determined parameter information (first parameter information).

For example, the second parameter information may be determined by rearranging an equation for a convolution operation between sample values and weights in a kernel to express the equation in terms of input pixel values (e.g., the pixels $i_0$, $i_1$, $i_2$, $i_3$, $i_4$, $i_5$, $i_6$, $i_7$, and $i_8$ in the first region 610). Because this has been described in detail with reference to FIG. 8, descriptions already provided above will be omitted below.

After the second parameter information is determined, the weight adjuster 710 may obtain the adjusted weights $w'_0$, $w'_1$, $w'_2$, $w'_3$, $w'_4$, $w'_5$, $w'_6$, $w'_7$, and $w'_8$ (820) based on weights in a kernel and the second parameter information.

The convolution unit 720 may obtain the feature value f1 corresponding to the first region 610 by performing a convolution operation between the adjusted weights $w'_0$, $w'_1$, $w'_2$, $w'_3$, $w'_4$, $w'_5$, $w'_6$, $w'_7$, and $w'_8$ (820) and the pixels $i_0$, $i_1$, $i_2$, $i_3$, $i_4$, $i_5$, $i_6$, $i_7$, and $i_8$ in the first region 610.

Figure 10:
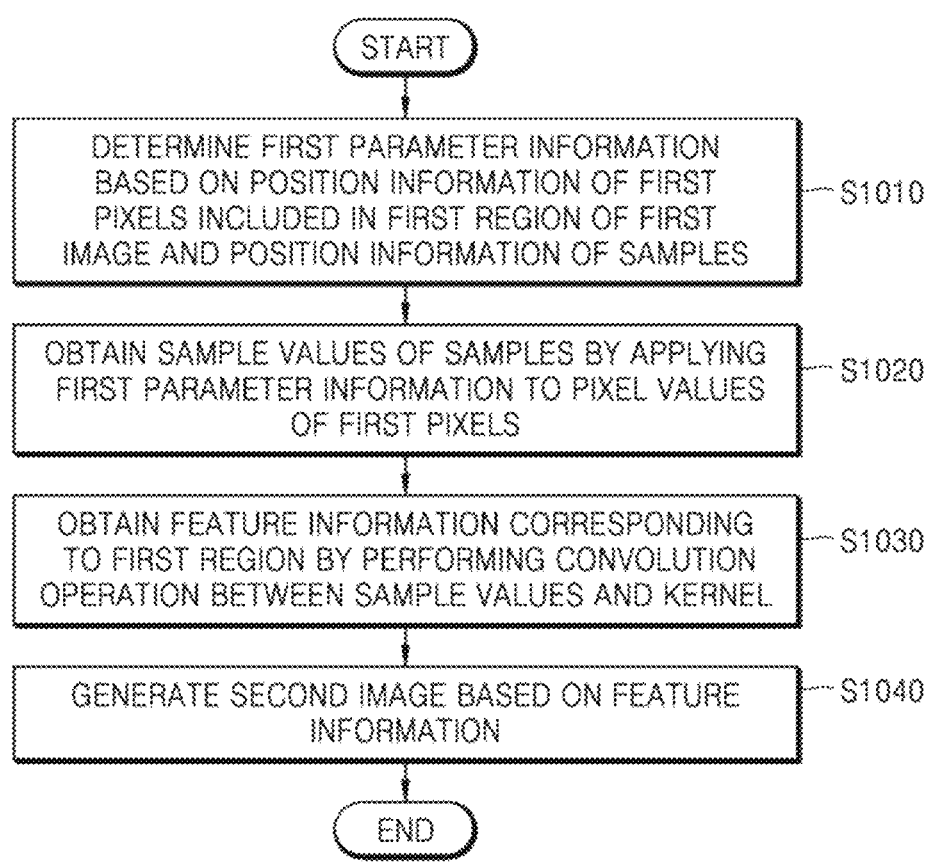
FIG. 10 is a flowchart of an operation method of an image processing apparatus, according to an embodiment of the disclosure.

FIG. 10 is a flowchart of an operation method of an image processing apparatus, according to an embodiment of the disclosure.

According to an embodiment of the disclosure, the image processing apparatus (100 of FIG. 1) may generate a second image by processing a first image using the CNN (2000 of FIG. 1) including a plurality of convolutional layers. One convolutional layer may have a structure for receiving the first image or first feature information and outputting second feature information.

Operations S1010 through S1030 of FIG. 10 represent operations performed in a convolutional layer.

Referring to FIG. 10, according to an embodiment of the disclosure, the image processing apparatus 100 may determine first parameter information based on position information of first pixels included in a first region of the first image and position information of samples to be taken (operation S1010).

For example, the first image may be an input image or feature information input to the convolutional layer. The image processing apparatus 100 may obtain a plurality of samples by sampling a center pixel located at a center among pixels included in the first region of the first image and sampling points that are equidistant from the center pixel. In detail, the image processing apparatus 100 may sample points located at intervals of a first angle from among points included in a circumference of a circle having the center pixel as its center and a first distance as its radius. In this case, the first distance may be a distance between the central pixel and a neighboring pixel nearest to the central pixel and the first angle may be 45 degrees, but are not limited thereto.

When samples are determined, the image processing apparatus 100 may determine first parameter information based on position information of the pixels included in the first region and position information of the determined samples. For example, the image processing apparatus 100 may determine first parameters applied to pixel values of pixels located in a neighborhood of a first sample based on a relationship between a position of the first sample and a position of each of the pixels in the neighborhood of the first sample. In detail, the image processing apparatus 100 may determine the first parameters applied to the pixel values of the pixels in the neighborhood of the first sample based on information about a distance between the first sample and each of the pixels in the neighborhood, information about areas formed based on the first sample and the pixels in the neighborhood, etc.

According to an embodiment of the disclosure, the image processing apparatus 100 may obtain sample values of samples by applying the first parameter information determined in operation S1010 to pixel values of the first pixels (operation S1020). For example, the image processing apparatus 100 may obtain a sample value of the first sample by applying the first parameters to the pixel values of the pixels in the neighborhood of the first sample. The image processing apparatus 100 may obtain sample values of the remaining samples in the same manner.

According to an embodiment of the disclosure, the image processing apparatus 100 may obtain feature information corresponding to the first region by performing a convolution operation between the sample values of the samples obtained in operation S1020 and a kernel (operation S1030).

For example, the number of samples may be equal to the number of weights included in the kernel, and feature information corresponding to the first region may be obtained by respectively multiplying the sample values of the samples by the corresponding weights and then summing the products together.

The image processing apparatus 100 may obtain feature information corresponding to the first image by repeatedly performing operations S1010 through S1030 for the remaining regions respectively centered on pixels included in the first image.

According to an embodiment of the disclosure, the image processing apparatus 100 may generate a second image based on feature information (operation S1040).

For example, the image processing apparatus 100 may obtain second feature information by inputting first feature information corresponding to the first image to a next convolutional layer. The image processing apparatus 100 may generate a second image based on final feature information obtained by repeatedly performing operations S1010 through S1030 in a plurality of convolutional layers.

According to an embodiment of the disclosure, the second image may be an image having a higher resolution and a higher quality than the first image. However, embodiments of the disclosure are not limited thereto.

Figure 11:
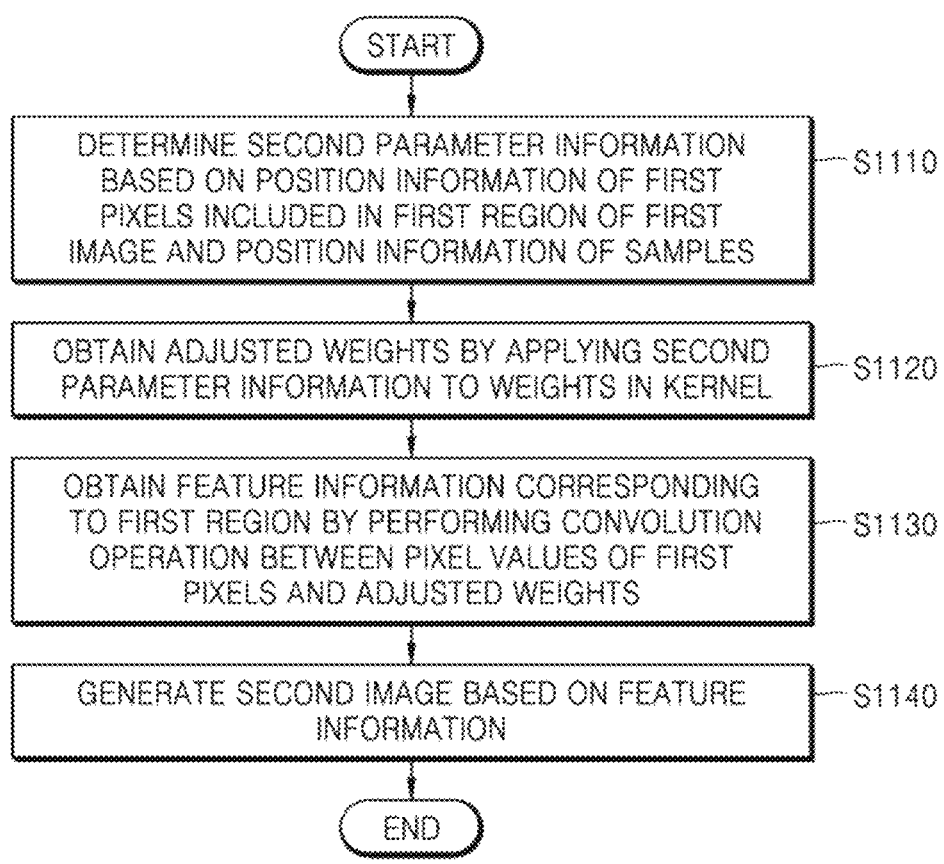
FIG. 11 is a flowchart of an operation method of an image processing apparatus, according to an embodiment of the disclosure.

FIG. 11 is a flowchart of an operation method of an image processing apparatus, according to an embodiment of the disclosure.

According to an embodiment of the disclosure, the image processing apparatus 100 may generate a second image by processing a first image using the CNN 2000 including a plurality of convolutional layers. One convolutional layer may have a structure for receiving the first image or first feature information and outputting second feature information.

Operations S1110 through S1130 of FIG. 10 represent operations performed in a convolutional layer.

Referring to FIG. 11, according to an embodiment of the disclosure, the image processing apparatus 100 may determine second parameter information for adjusting weights based on position information of first pixels included in a first region of the first image and position information of samples to be taken (operation S1110).

For example, the image processing apparatus 100 may determine the first parameter information as described with reference to operation S1010 of FIG. 10, and determine, based on the first parameter information, second parameter information for obtaining adjusted weights by rearranging an equation for a convolution operation between sample values and weights in a kernel to express an equation in terms of the first pixels (input pixel values).

According to an embodiment of the disclosure, after the second parameter information is determined, the image processing apparatus 100 may obtain adjusted weights $w'_0$, $w'_1$, $w'_2$, $w'_3$, $w'_4$, $w'_5$, $w'_6$, $w'_7$, and $w'_8$ based on weights in a kernel and the second parameter information (operation S1120).

According to an embodiment of the disclosure, the image processing apparatus 100 may obtain feature information corresponding to the first region by performing a convolution operation between pixel values of the first pixels and the adjusted weights (operation S1130).

For example, the image processing apparatus 100 may obtain feature information corresponding to the first region by respectively multiplying pixel values of the first pixels by the adjusted weights and then summing the products together.

Accordingly, unlike in operations described with reference to FIG. 10, each time a region (input pixel values) to be subjected to a convolution operation changes, a convolution operation may be performed with input pixel values by using the adjusted weights, without the need to calculate sample values by applying the first parameter information and then perform a convolution operation between the sample values and weights in a kernel, and accordingly, the efficiency of calculation may be improved.

For example, the image processing apparatus 100 may obtain feature information corresponding to the first image by performing, for regions centered on pixels included in the first image, convolution operations with the adjusted weights obtained in operation S1120.

According to an embodiment of the disclosure, the image processing apparatus 100 may generate a second image based on feature information (operation S1140).

For example, the image processing apparatus 100 may obtain second feature information by inputting first feature information corresponding to the first image to a next convolutional layer. The image processing apparatus 100 may generate a second image based on final feature information obtained by repeatedly performing operations S1110 through S1130 in a plurality of convolutional layers.

According to an embodiment of the disclosure, the second image may be an image having a higher resolution and a higher quality than the first image. However, embodiments of the disclosure are not limited thereto.

Figure 12:
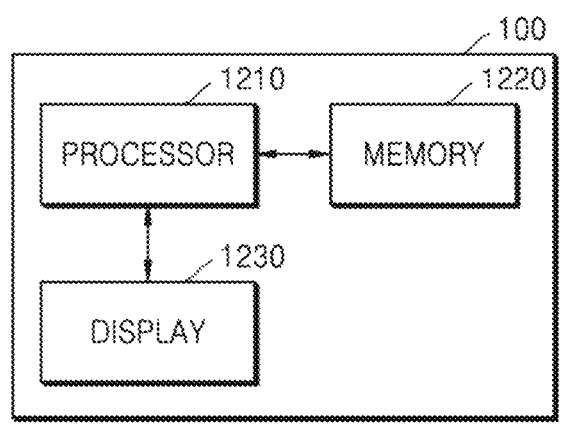
FIG. 12 is a block diagram of a configuration of an image processing apparatus according to an embodiment of the disclosure.

FIG. 12 is a block diagram of a configuration of an image processing apparatus according to an embodiment of the disclosure.

The image processing apparatus 100 of FIG. 12 may be an apparatus that performs image processing using a CNN including the convolutional layer 500 illustrated and described with reference to FIGS. 5 and 6. Alternatively, the image processing apparatus 100 of FIG. 12 may be an apparatus that performs image processing using a CNN including the convolutional layer 700 illustrated and described with reference to FIGS. 7 and 8.

Referring to FIG. 12, according to an embodiment of the disclosure, the image processing apparatus 100 may include a processor 1210, a memory 1220, and a display 1230.

According to an embodiment of the disclosure, the processor 1210 may control all operations of the image processing apparatus 100. According to an embodiment of the disclosure, the processor 1210 may execute one or more programs stored in the memory 1220.

According to an embodiment of the disclosure, the memory 1220 may store various pieces of data, programs, or applications for driving and controlling the image processing apparatus 100. A program stored in the memory 1220 may include one or more instructions. A program (one or more instructions) or an application stored in the memory 1220 may be executed by the processor 1210.

According to an embodiment of the disclosure, the processor 1210 may include at least one of a central processing unit (CPU), a graphics processing unit (GPU), or a video processing unit (VPU). Alternatively, according to an embodiment of the disclosure, the processor 1210 may be implemented in the form of a system-on-chip (SoC) that integrates at least one of a CPU, a GPU, or a VPU. Alternatively, the processor 1210 may further include a neural processing unit (NPU).

According to an embodiment of the disclosure, the processor 1210 may generate a second image by processing a first image using a CNN including one or more convolutional layers. For example, the processor 1210 may perform sampling for a first region to be subjected to a convolution operation among pixels included in the first image or first feature information input to a convolutional layer. For example, the processor 1210 may obtain a plurality of samples by sampling a center pixel and points that are equidistant from the center pixel from among pixels included in the first region.

The processor 1210 may obtain sample values of determined samples based on pixel values of the pixels in the first region. For example, the processor 1210 may obtain sample values of samples by applying first parameter information to pixel values of the pixels in the first region. In this case, the processor 1210 may determine the first parameter information based on position information of the pixels included in the first region and position information of the determined samples.

In detail, the processor 1210 may obtain a sample value of a first sample based on pixel values of pixels in a neighborhood of the first sample. The processor 1210 may determine first parameters based on information about a distance between the first sample and each of the pixels in the neighborhood of the first sample, information about areas formed based on the first sample and the pixels in the neighborhood of the first sample, etc.

The processor 1210 may obtain a sample value of the first sample by applying the first parameters to the pixels in the neighborhood of the first sample. The processor 1210 may obtain sample values of the remaining samples by using the same method.

After sample values of the samples are determined, the processor 1210 may obtain a feature value corresponding to the first region by performing a convolution operation between the sample values and a kernel.

The processor 1210 may perform convolution operations for the remaining regions in the first image or first feature information in the same manner as above, and obtain second feature information corresponding to the first image or first feature information.

The processor 1210 may generate a second image based on the second feature information. In this case, the second image may be an image having a higher resolution and a higher quality than the first image. However, embodiments of the disclosure are not limited thereto.

Moreover, as described above, when sample values are obtained by applying parameter information to pixel values and then a convolution operation is performed between the sample values and a kernel, the parameter information needs to be applied to input pixel values each time a convolution is performed, and thus, the amount of computation increases.

Thus, according to an embodiment of the disclosure, to reduce the amount of computation, the processor 1210 may obtain adjusted weights in a kernel by applying second parameter information to the weights and perform a convolution operation between pixel values and the adjusted weights.

In detail, the processor 1210 may adjust weights in a kernel by applying the second parameter information to the weights. For example, the processor 1210 may determine first parameter information based on position information of pixels included in the first region and position information of samples. The samples may be expressed by an equation for first pixels based on the first parameter information, and accordingly, when an equation for a convolution operation between the samples and weights in a kernel is rearranged to express the equation in terms of the first pixels, second parameter information for obtaining adjusted weights may be determined. For example, as described with reference to Equations 8 through 16, adjusted weights respectively applied to the first pixels may be obtained, and the adjusted weights may be expressed by an equation obtained by applying the second parameter information to the weights in the kernel.

The processor 1210 may obtain, based on Equations 8 through 16, the adjusted weights by applying second parameters to the weights in the kernel.

The processor 1210 may obtain a feature value corresponding to the first region by performing a convolution operation between the pixel values of the first pixels and the adjusted weights.

The processor 1210 may obtain second feature information corresponding to the first image or first feature information by performing a convolution operation with the adjusted weights for the remaining regions of the first image or first feature information. The processor 1210 may generate a second image based on the second feature information.

According to an embodiment of the disclosure, the display 1230 generates a driving signal by converting an image signal, a data signal, an on-screen display (OSD) signal, a control signal, etc. processed by the processor 1210. The display 1230 may be implemented as a plasma display panel (PDP), a liquid crystal display (LCD), an organic light-emitting diode (OLED) display, a flexible display, or a three-dimensional (3D) display. Furthermore, the display 1230 may be formed as a touch screen to serve as an input device as well as an output device.

According to an embodiment of the disclosure, the display 1230 may display the second image obtained by performing image processing using the CNN 2000.

The block diagram of the image processing apparatus 100 of FIG. 12 is provided for illustration of an embodiment of the disclosure. Each of the components in the block diagram may be integrated, added, or omitted according to the specification of the image processing apparatus 100 that is actually implemented. In other words, two or more components may be combined into a single component, or a single component may be split into two or more components when necessary. Furthermore, functions performed by each block are intended to describe embodiments of the disclosure, and a specific operation or device related to the functions does not limit the scope of the disclosure.

An operation method of an image processing apparatus according to an embodiment of the disclosure may be implemented in the form of program instructions that may be performed by various types of computers and may be recorded on computer-readable recording media. The computer-readable recording media may include program instructions, data files, data structures, etc. either alone or in combination. The program instructions recorded on the computer-readable recording media may be designed and configured specially for the disclosure or may be known to and be usable by those skilled in the art of computer software. Examples of the computer-readable recording media include magnetic media such as hard disks, floppy disks, and magnetic tapes, optical media such as compact disk read-only memory (CD-ROM) and digital versatile disks (DVDs), magneto-optical media such as floptical disks, and hardware devices that are specially configured to store and perform program instructions, such as ROM, random access memory (RAM), flash memory, etc. Examples of program instructions include not only machine code such as that created by a compiler but also high-level language code that may be executed by a computer using an interpreter or the like.

In addition, an image processing apparatus and an operation method of the image processing apparatus according to embodiments of the disclosure may be included in a computer program product when provided. The computer program product may be traded, as a product, between a seller and a buyer.

The computer program product may include a software program and a computer-readable storage medium having the software program stored thereon. For example, the computer program product may include a product (e.g., a downloadable application) in the form of a software program electronically distributed by a manufacturer of an electronic device or through an electronic market. For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where there is a third device (e.g., a smartphone) communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Alternatively, at least two of the server, the client device, and the third device may execute the computer program product to perform the methods according to the embodiments of the disclosure in a distributed manner.

For example, the server (e.g., a cloud server, an artificial intelligence server, or the like) may execute the computer program product stored therein to control the client device communicatively connected to the server to perform the methods according to the embodiments of the disclosure.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing apparatus comprising:
at least one memory storing one or more instructions; and
at least one processor configured to execute the one or more instructions stored in the at least one memory,
wherein the at least one processor is configured to execute the one or more instructions to use one or more convolutional neural networks to:
determine first parameters based on position information of first pixels included in a first region of a first image and position information of samples of the first image, wherein the first pixels comprise a center pixel located at a center of the first region and neighboring pixels of the center pixel, the samples comprise the center pixel, and the samples other than the center pixel are each equidistant from the center pixel;
obtain sample values of the samples by applying the first parameters to pixel values of the first pixels;
obtain feature information corresponding to the first region by performing a convolution operation between the sample values and a kernel of the one or more convolutional neural networks; and
generate a second image, based on the feature information.

2. The image processing apparatus of claim 1, wherein a number of the samples is equal to a number of weights in the kernel.

3. The image processing apparatus of claim 1, wherein the at least one processor is further configured to execute the one or more instructions to determine the first parameters, based on at least one of information about distances between the first pixels and the samples or information about areas of regions formed based on the first pixels and the samples.

4. The image processing apparatus of claim 1, wherein the at least one processor is further configured to execute the one or more instructions to obtain a first sample value of a first sample by applying the first parameters to pixel values of second pixels located in a neighborhood of the first sample among the first pixels.

5. The image processing apparatus of claim 4, wherein the at least one processor is further configured to execute the one or more instructions to determine the first parameters, based on distances between the second pixels and the first sample.

6. The image processing apparatus of claim 4, wherein a sum of the first parameters applied to the second pixels is 1.

7. An image processing apparatus comprising:
at least one memory storing one or more instructions; and
at least one processor configured to execute the one or more instructions stored in the at least one memory,
wherein the at least one processor is configured to execute the one or more instructions to use one or more convolutional neural networks to:
determine first parameters based on position information of first pixels included in a first region of a first image and position information of samples of the first image, and information about areas of regions formed by the second pixels and a first sample, wherein the first sample is included in the samples of the first image;
obtain sample values of the samples by applying the first parameters to pixel values of the first pixels;
obtain feature information corresponding to the first region by performing a convolution operation between the sample values and a kernel of the one or more convolutional neural networks; and generate a second image, based on the feature information.

8. An image processing apparatus comprising:
at least one memory storing one or more instructions; and
at least one processor configured to execute the one or more instructions stored in the at least one memory,
wherein the at least one processor is configured to execute the one or more instructions to use one or more convolutional neural networks to:
determine first parameters, based on position information of first pixels included in a first region of a first image and position information of samples, wherein the first pixels comprise a center pixel located at a center of the first region and neighboring pixels of the center pixel, the samples comprise the center pixel, and the samples other than the center pixel are each equidistant from the center pixel;
obtain adjusted weights by applying the first parameters to weights in a kernel of the one or more convolutional neural networks;
obtain feature information corresponding to the first region by performing a convolution operation between pixel values of the first pixels and the adjusted weights; and
generate a second image, based on the feature information.

9. The image processing apparatus of claim 8, wherein the at least one processor is further configured to execute the one or more instructions to determine the first parameters, based on at least one of information about distances between the first pixels and the samples or information about areas of regions formed based on the first pixels and the samples.

10. The image processing apparatus of claim 9, wherein the at least one processor is further configured to execute the one or more instructions to determine the first parameters, based on the weights in the kernel.

11. An operation method of an image processing apparatus for processing an image by using one or more convolutional neural networks, the operation method comprising:
determining first parameters, based on position information of first pixels included in a first region of a first image and position information of samples of the first image, wherein the first pixels comprise a center pixel located at a center of the first region and neighboring pixels of the center pixel, the samples comprise the center pixel, and the samples other than the center pixel are each equidistant from the center pixel;
obtaining sample values of the samples by applying the first parameters to pixel values of the first pixels;
obtaining feature information corresponding to the first region by performing a convolution operation between the sample values and a kernel of the one or more convolutional neural networks; and
generating a second image, based on the feature information.

12. The operation method of claim 11, wherein a number of the samples is equal to a number of weights in the kernel.

13. The operation method of claim 11, wherein the determining of the first parameters comprises determining the first parameters, based on at least one of information about distances between the first pixels and the samples or information about areas of regions formed based on the first pixels and the samples.

14. The operation method of claim 11, wherein the obtaining of the sample values comprises obtaining a first sample value of a first sample by applying the first parameters to pixel values of second pixels located in a neighborhood of the first sample among the first pixels.

15. The operation method of claim 14, wherein the determining of the first parameters comprises determining the first parameters, based on distances between the second pixels and the first sample.

16. The operation method of claim 14, wherein a sum of the first parameters applied to the second pixels is 1.

17. An operation method of an image processing apparatus for processing an image by using one or more convolutional neural networks, the operation method comprising:
determining first parameters, based on position information of first pixels included in a first region of a first image and position information of samples of the first image, and information about areas of regions formed by the second pixels and a first sample, wherein the first sample is included the samples of the first image;
obtaining sample values of the samples by applying the first parameters to pixel values of the first pixels;
obtaining feature information corresponding to the first region by performing a convolution operation between the sample values and a kernel of the one or more convolutional neural networks; and
generating a second image, based on the feature information.

* * * * *